United States Patent
Zou

(10) Patent No.: US 12,134,713 B2
(45) Date of Patent: Nov. 5, 2024

(54) CLASSIFYING COMPARATORS BASED ON COMPARATOR OFFSETS

(71) Applicant: Microchip Technology Incorporated, Chandler, AZ (US)

(72) Inventor: Zhi-Yuan Zou, Colorado Springs, CO (US)

(73) Assignee: Microchip Technology Incorporated, Chandler, AZ (US)

( * ) Notice: Subject to any disclaimer, the term of this patent is extended or adjusted under 35 U.S.C. 154(b) by 818 days.

(21) Appl. No.: 16/294,467

(22) Filed: Mar. 6, 2019

(65) Prior Publication Data

US 2020/0213139 A1 Jul. 2, 2020

Related U.S. Application Data

(60) Provisional application No. 62/786,015, filed on Dec. 28, 2018.

(51) Int. Cl.
*G01R 31/00* (2006.01)
*C08F 2/50* (2006.01)
(Continued)

(52) U.S. Cl.
CPC ............ *C09J 151/003* (2013.01); *C08F 2/50* (2013.01); *C08F 220/06* (2013.01);
(Continued)

(58) Field of Classification Search
None
See application file for complete search history.

(56) References Cited

U.S. PATENT DOCUMENTS 3,992,665 A * 11/1976 Preikschat ............. G01R 17/10
324/680
4,983,926 A * 1/1991 Groehl ................ H03F 3/45479
330/9
(Continued)

FOREIGN PATENT DOCUMENTS

CN 1169562 A 1/1998
CN 1518231 A * 8/2004 .......... H03M 1/1019
(Continued)

OTHER PUBLICATIONS

First Office Action and Search Report of Chinese Patent Application No. 201980086569.5, issued Dec. 19, 2023, 38 pages with English translation.
(Continued)

*Primary Examiner* — Shin-Hon (Eric) Chen
*Assistant Examiner* — Thomas A Carnes
(74) *Attorney, Agent, or Firm* — TraskBritt

(57) ABSTRACT

Various embodiments relate to classifying comparators based on comparator offsets. A method may include applying, via a strobe, a first voltage to each of a first input and a second input of a comparator to generate a number of output signals from the comparator, wherein each output signal has one of a first polarity and a second polarity. The method may further include in response to each of the number of output signals being the first polarity, applying, via a strobe, an external offset voltage having the second polarity to the comparator to generate a second number of output signals. Further, the method may include in response to each of the second number of output signals being the same polarity, identifying the comparator as a reliable comparator.

13 Claims, 7 Drawing Sheets

(51) Int. Cl.

| | |
|---|---|
| C08F 220/06 | (2006.01) |
| C08F 220/18 | (2006.01) |
| C08F 236/20 | (2006.01) |
| C08F 236/22 | (2006.01) |
| C08K 5/00 | (2006.01) |
| C08K 5/01 | (2006.01) |
| C08K 5/132 | (2006.01) |
| C08K 5/37 | (2006.01) |
| C08K 7/28 | (2006.01) |
| C09J 7/38 | (2018.01) |
| C09J 133/08 | (2006.01) |
| C09J 133/10 | (2006.01) |
| C09J 151/00 | (2006.01) |
| G01R 23/00 | (2006.01) |
| G01R 31/30 | (2006.01) |
| G01R 31/317 | (2006.01) |
| H04L 9/08 | (2006.01) |
| H04L 9/32 | (2006.01) |

(52) U.S. Cl.
CPC .. *C08F 220/1808* (2020.02); *C08F 220/1811* (2020.02); *C08F 236/20* (2013.01); *C08F 236/22* (2013.01); *C08K 5/0025* (2013.01); *C08K 5/01* (2013.01); *C08K 5/132* (2013.01); *C08K 5/37* (2013.01); *C08K 7/28* (2013.01); *C09J 7/38* (2018.01); *C09J 133/08* (2013.01); *C09J 133/10* (2013.01); *G01R 23/005* (2013.01); *G01R 31/002* (2013.01); *G01R 31/30* (2013.01); *G01R 31/31709* (2013.01); *G01R 31/31719* (2013.01); *H04L 9/0866* (2013.01); *H04L 9/3278* (2013.01); *C09J 2203/00* (2013.01); *C09J 2400/14* (2013.01); *C09J 2400/22* (2013.01); *C09J 2423/106* (2013.01); *C09J 2423/166* (2013.01); *G01R 31/31703* (2013.01)

(56) References Cited

U.S. PATENT DOCUMENTS

| | | | | |
|---|---|---|---|---|
| 5,367,266 | A * | 11/1994 | Kang | G01R 23/005 |
| | | | | 327/47 |
| 5,910,762 | A | 6/1999 | Kurotsu | |
| 9,209,757 | B1 * | 12/2015 | Thandri | H03F 1/0227 |
| 9,485,094 | B1 * | 11/2016 | Parvarandeh | H04L 9/0861 |
| 10,038,446 | B2 * | 7/2018 | Mai | H03K 19/00315 |
| 11,038,680 | B2 * | 6/2021 | Danger | H04L 9/3278 |
| 2003/0016060 | A1 | 1/2003 | Tam | |
| 2005/0004775 | A1 | 1/2005 | Cirkel | |
| 2006/0139195 | A1 * | 6/2006 | Casper | H03M 1/667 |
| | | | | 341/144 |
| 2010/0225358 | A1 * | 9/2010 | Kosic | H03K 5/2481 |
| | | | | 327/63 |
| 2012/0206281 | A1 * | 8/2012 | Bashirullah | H03M 1/1061 |
| | | | | 341/110 |
| 2012/0293346 | A1 | 11/2012 | Takayama et al. | |
| 2013/0093467 | A1 * | 4/2013 | Kosic | H03K 5/2445 |
| | | | | 327/77 |
| 2014/0132232 | A1 * | 5/2014 | MacLean | G05F 1/62 |
| | | | | 323/271 |
| 2016/0182045 | A1 * | 6/2016 | Mai | H04L 9/3278 |
| | | | | 326/8 |
| 2016/0359627 | A1 * | 12/2016 | Lewis | G06F 21/86 |
| 2017/0180140 | A1 * | 6/2017 | Mai | G06F 21/72 |
| 2020/0007350 | A1 * | 1/2020 | Shifman | G11C 11/417 |
| 2020/0213139 | A1 * | 7/2020 | Zou | G01R 31/31709 |
| 2020/0358609 | A1 * | 11/2020 | Kwak | H04L 9/0877 |
| 2021/0248275 | A1 * | 8/2021 | Lee | H04L 9/3278 |
| 2021/0250187 | A1 * | 8/2021 | Lu | G06F 21/44 |

FOREIGN PATENT DOCUMENTS

| | | | | | |
|---|---|---|---|---|---|
| CN | 102792593 | A | | 11/2012 | |
| CN | 204258756 | U | * | 4/2015 | |
| CN | 112393810 | A | * | 2/2021 | G01J 1/46 |
| CN | 113297634 | A | * | 8/2021 | G06F 21/71 |
| JP | 02-113727 | A | | 4/1990 | |
| JP | 2004-040711 | A | | 2/2004 | |
| JP | 2017004587 | A | * | 1/2017 | G11C 13/0007 |
| KR | 10-0887070 | B1 | | 3/2009 | |
| WO | WO-2015027070 | A1 | * | 2/2015 | G09C 1/00 |
| WO | WO-2015148659 | A1 | * | 10/2015 | G06F 21/72 |
| WO | WO-2020029267 | A1 | * | 2/2020 | G06F 21/72 |

OTHER PUBLICATIONS

Jing et al., Nondeterministic Logic Based Arbiter Physical Unclonable Function, Journal of Computer-Aided Design & Computer Graphics, vol. 29(1), Jan. 2017, pp. 166-171 with English Abstract.
Zhang et al., Survey of Physical Unclonable Function, Journal of Computer Applications, vol. 32(11), dated Nov. 1, 2012, pp. 3115-3120 with English Abstract.
Zihan et al., Hardware Implementation of Physical Unclonable Function on FPGAs, Journal of Computer-Aided Design & Computer Graphics, vol. 29(9), Sep. 2017, pp. 1590-1603 with English Abstract.
Outgoing—ISA/210—International Search Report Mailed on Feb. 6, 2020 for WO Application No. PCT/US19/057960.
Outgoing Written Opinion of the ISA Mailed on Feb. 6, 2020 for WO Application No. PCT/US19/057960.

* cited by examiner

CLASSIFYING COMPARATORS BASED ON COMPARATOR OFFSETS

CROSS-REFERENCE TO RELATED APPLICATION

A claim for benefit of priority to the Dec. 28, 2018 filing date of the U.S. Patent Provisional Application No. 62/786,015 titled "METHODS OF CLASSIFYING COMPARATORS BASED ON COMPARATOR OFFSETS" (the '015 Provisional Application), is hereby made pursuant to 35 U.S.C. § 119(e). The entire disclosure of the '015 Provisional Application is hereby incorporated herein.

FIELD

The present disclosure relates generally to classifying comparators based on comparator offsets, and more specifically, to identifying comparators with suitable offsets for reliable key generation.

BACKGROUND

A physical unclonable function (PUF) may serve as a unique physical identity in a physical structure (e.g., a semiconductor device such as a microprocessor). A PUF, which is based on a physical variation that may occur naturally during a semiconductor manufacturing process, may allow for differentiation between otherwise identical semiconductor devices. Because semiconductor devices may be slightly different, operation of the semiconductor devices (e.g., outputs generated by the semiconductor devices) may vary.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
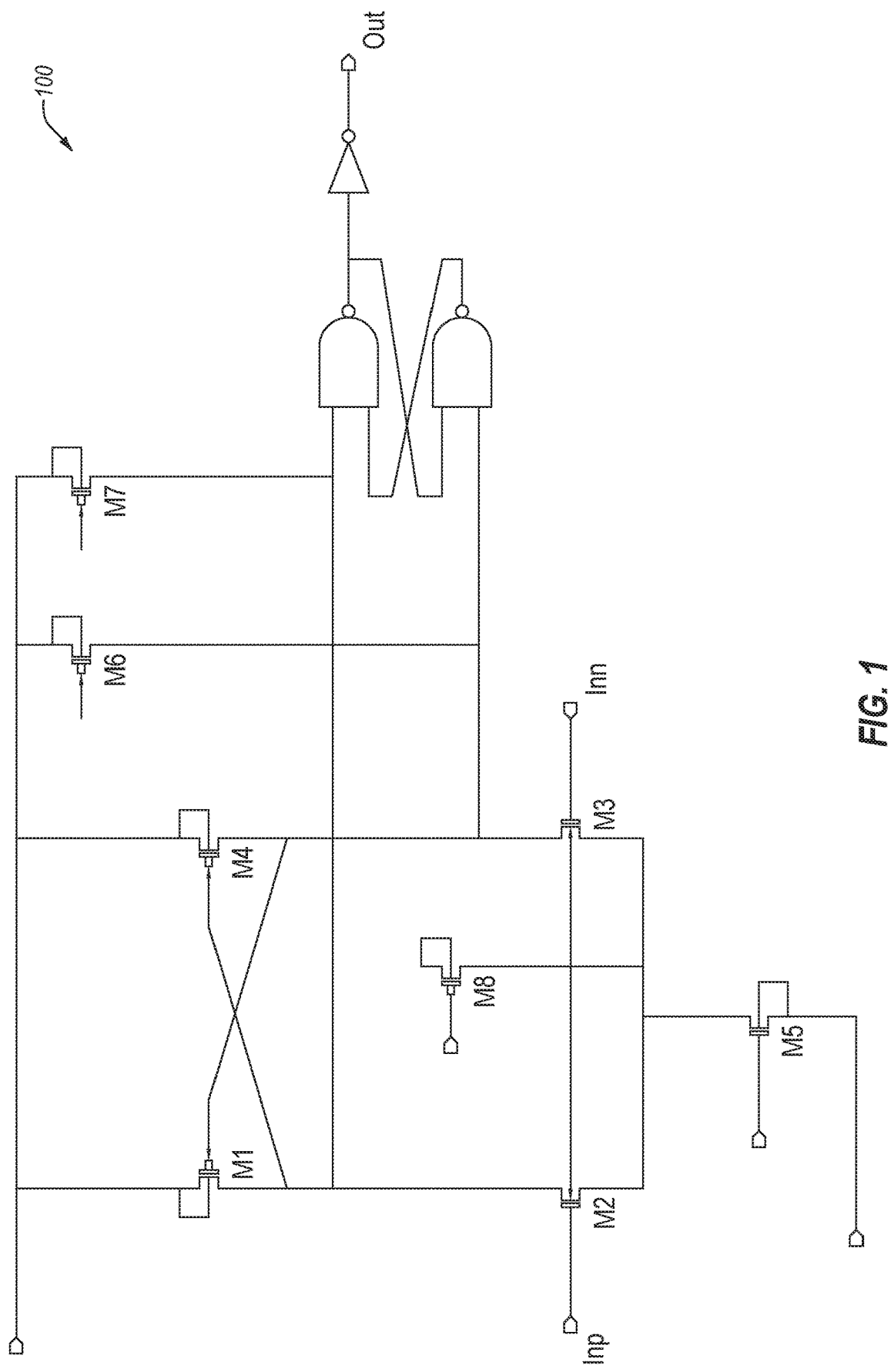
FIG. 1 depicts a comparator circuit, according to one or more embodiments of the disclosure.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Although a manufacturing process may be the same for a number of devices (e.g., integrated circuits (ICs)), each device may be slightly different due to normal manufacturing variabilities. More specifically, one or more physical properties of the devices may vary from device to device due to the manufacturing process. One or more distinct physical properties of a device (e.g., an IC) that vary from device to device due to the manufacturing process may be considered a physical unclonable function (PUF) of the device (e.g., if it can be used to generate an electrical function reflecting the variation). Because devices may be slightly different, operation of the devices (e.g., outputs generated by the devices) may be different. More specifically, for example, outputs (e.g .., output values for a given output) of various comparator ICs may vary based on PUFs of the comparator ICs. For example, some comparators may have relatively large input offsets and some comparators may have relatively small input offsets. Comparators with relatively small offsets may have outputs that change polarity due to, for example, noise and/or offset drift (e.g., due to changes in temperature and/or supply voltages). Comparators with relatively large offsets may be more tolerable to noise and offset drift. In other words, comparators with relatively large offsets may have more stable outputs (e.g., the outputs may not change due to noise and offset drift).

Various embodiments described herein relate to classifying comparators based on comparator offsets, and more specifically, to methods for identifying comparators including suitable offsets (e.g., for reliable key generation). Yet more specifically, some embodiments may relate to sorting and identifying comparators for reliable key generation (e.g., PUF key generation) based on offset values of the comparators, and the use of the identified comparators to generate a reliable key.

To utilize comparators for key generation (e.g., wherein each comparator generates one or more bits for multi-bit key), it may be advantageous that each comparator cell on each integrated circuit be repeatable. Thus, in some embodiments utilizing comparators for key generation, a comparator output should be the same over the lifetime of the comparator and under all operating conditions (e.g., variations in noise, temperature, and/or supply voltage). Accordingly, for key generation, it may be advantageous to utilize comparators with relatively large offsets.

Rather than measuring actual exact offset values of each comparator (e.g., via detecting when a comparator output switches), various embodiments as disclosed herein identify comparators with sufficient offsets via one or more tests. Measuring actual exact offset values for comparators may not be required. According to some embodiments, during one testing phase (e.g., a first testing phase) a comparator may be tested via strobing the comparator multiple times with the two identical inputs (e.g., two inputs tied together). If a polarity of an output of the comparator does not remain the same for each strobe, it may be determined that an offset of the comparator is too small, and thus the output of the comparator may be affected by noise. In these embodiments, comparators with offsets that are too small may be rejected, and other remaining comparators may be divided into groups (e.g., two groups) depending on comparator outputs (e.g., comparators outputting a positive offset (e.g., an output having a positive polarity) may be in one group (e.g., "group 1") and comparators outputting a negative offset (e.g., an output having a negative polarity) may be in another group (e.g., "group 2")).

Further, the remaining comparators may be tested. More specifically, during another testing phase (e.g., a second testing phase), each of the remaining comparator may be supplied an external offset voltage. According to some embodiments, the external offset voltage applied to a comparator (i.e., at the inputs of the comparator) may have a known absolute value and a polarity that is opposite of a polarity of the offset of the comparator. For example, if a comparator has positive offset (e.g., in group "1"), a negative external offset voltage may be supplied to the comparator. If a comparator has negative offset (e.g., in group "2"), a positive external offset voltage may be supplied to the comparator. The external offset voltage may be determined based on one or more factors. For example, according to some embodiments, the external offset voltage may be selected based on comparator noise, offset drift with temperature, supply voltage, and/or time. More specifically, for example, the sum of these parameters may be used to determine the external test voltage.

In some embodiments, a comparator may be strobed multiple times with the external offset voltage. If a polarity of the comparator output does not remain the same as before, or does not remain the same for each strobe, the comparator may be rejected. Otherwise, comparators having outputs that remain the same as before and for each strobe, may be identified as reliable comparators and may be used as PUF comparator cells (e.g., in key generation).

In some embodiments, an absolute value of an offset of the remaining comparators may be equal to or greater than the predefined external offset voltage. Further, in some embodiments, if the comparator noise and offset drift (e.g., with temperature, supply voltage and time) may be determined empirically, the sum of these parameters may be used as the external test voltage for comparator sorting, which may ensure the comparator repeatability.

According to various embodiments, one or more testing phases may be used to classify a comparator. For example, in some embodiments, a comparator may be classified as either reliable or unreliable based either the first testing phase (e.g., wherein inputs of the comparator receive the same signal (e.g., the inputs are tied together)) or a second testing phase (e.g., wherein inputs of the comparator receive an offset voltage). In other embodiments, a comparator may be classified as either reliable or unreliable based on more than one testing phase (e.g., the first testing phase and the second testing phase).

Various embodiments disclosed herein may improve comparator classification. Further, comparators with relatively high repeatability may be used in generating a reliable bit in key generation, thus improving key generation (e.g., for encryption and decryption). For at least these reasons, various embodiments of the present disclosure, as described more fully herein, provide a technical solution to one or more problems that arise from technology that could not reasonably be performed by a person, and various embodiments disclosed herein are rooted in computer technology in order to overcome the problems and/or challenges described above. Further, at least some embodiments disclosed herein may improve computer-related technology by allowing computer performance of a function not previously performable by a computer.

Various embodiments of the present disclosure are now explained with reference to the accompanying drawings.

FIG. 1 depicts an example comparator circuit 100, according to one or more embodiments of the disclosure. Comparator circuit 100 includes differential inputs Inp and Inn, a plurality of switches (e.g., transistors M1-M8), cross coupled NAND gates configured as an SR flip-flop, and an output Out. During a contemplated operation, an output signal generated at output Out may be based on a signal received an input Inp and a signal received an input Inn. As will be appreciated by a person having ordinary skill in the art, noise, offset, and/or offset drift may impact the output signal. According to various embodiments, depending on a testing phase, input Inp and input Inn may or may not be configured to receive the same input. More specifically, in one testing phase, input Inp and input Inn may receive the same input (e.g., input Inp and input Inn may be tied together). In another testing phase, input Inp and input Inn may be configured to receive a different signal (e.g., an offset voltage may be applied to the inputs). Comparator circuit 100 is provided as an example comparator circuit, and the disclosure is not limited to any particular comparator circuit.

Figure 2:
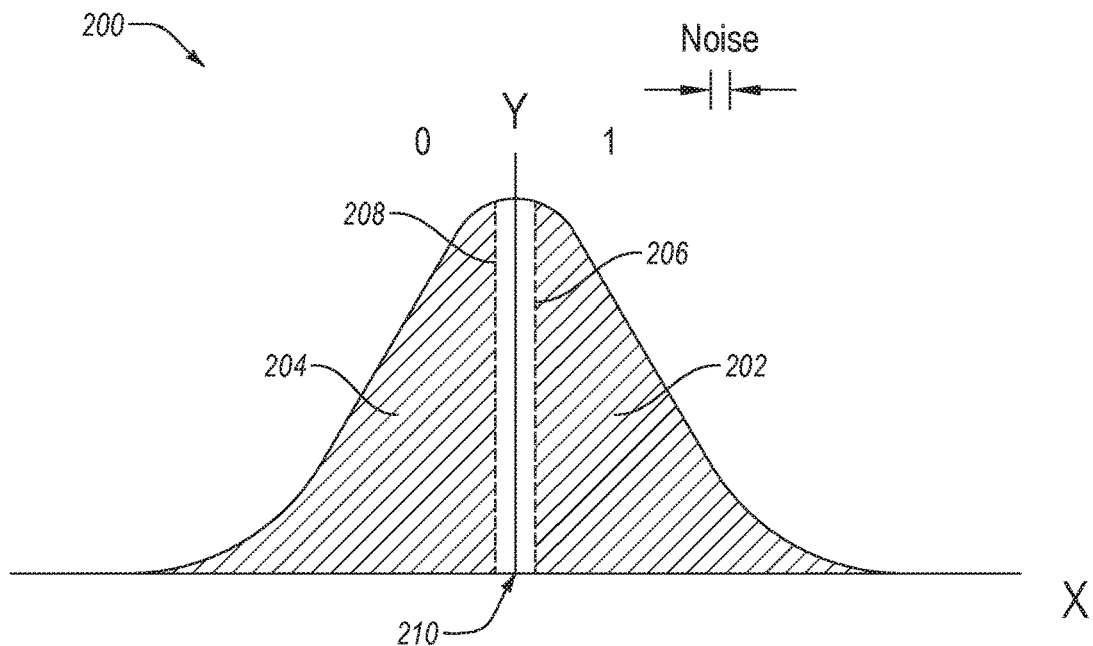
FIGS. 2 and 3 are plots for depicting comparator input offset statistical distribution, according to one or more embodiments of the disclosure.

FIG. 2 is a plot 200 including an area 202 (i.e., to the right of the Y axis; labeled as "1") and an area 204 (i.e., to the left of the Y axis; labeled as "0"). According to some embodiments, comparators having a positive input offset may be represented to the right of the Y axis (e.g., in area 202) and comparators having a negative input offset may be represented to the left of the Y axis (e.g., in area 204). Further, the larger the offset of a comparator, the farther the offset may be from the Y axis. For example, the offset of a comparator having an offset of 2× may be farther away from the Y axis than for a comparator having an offset of 1×. Comparators having an offset positioned between dashed lines 206 and 208 (e.g., in region 210 of FIG. 2) have a relatively low offset, and therefore the outputs of these comparators may be susceptible to noise and/or offset drift.

As noted above, according to some embodiments, a comparator may be tested via strobing the comparator multiple times with identical inputs (e.g., two inputs of the comparator are tied together). Stated another way, with reference again to FIG. 1, a number of strobe pulses may be applied to a gate of M5 gate, while an input (e.g., a voltage) may be applied to each of input Inp and input Inn. If a polarity of an output of the comparator does not remain the same for each strobe, it may be determined that an offset of the comparator is too small (e.g., the output is between dashed lines 206 and 208) and thus, the output of the comparator may be affected by noise or other phenomena causing an offset drift. It is noted that, in at least some embodiments, the strobing and the output signal values may happen in sequence. In other words, an output signal value is generated in response to each input strobe.

In these embodiments, comparators with offsets that are too small may be rejected (e.g., as unreliable), and other remaining comparators may be divided into groups (e.g., two groups) depending on comparator outputs. For example, comparators outputting a positive offset may be in one group (e.g., "group 1") and comparators outputting a negative offset may be in another group (e.g., "group 2").

Moreover, the remaining comparators (e.g., the comparators in groups 1 and 2) may be further tested. More specifically, each of the remaining comparator may be supplied an external offset voltage. The external offset voltage applied to a comparator (i.e., at its inputs) may have a polarity that is opposite of a polarity of the offset of the comparator. For example, if a comparator has positive offset (e.g., in group "1"), a negative external offset voltage may be supplied to the comparator (e.g., the potential at the input Inp of the comparator is negative in relation to the potential at input Inn of the comparator). If a comparator has negative offset (e.g., in group "2"), a positive external offset voltage may be supplied to the comparator (e.g., the potential at input Inp of the comparator is positive in relation to the potential at input Inn of the comparator). The absolute value of the applied offset voltages may be selected so as to be within a predetermined range appropriate for PUF generation.

In some embodiments, each comparator may be strobed multiple times with the external offset voltage. Stated another way, with reference again to FIG. 1, a number of strobe pulses may be applied to a gate of transistor M5 gate, while the external voltage may be applied to inputs Inp/Inn. If an output of the comparator changes polarity (e.g., a comparator in group 1 is applied a negative offset or a comparator in group 2 is applied a positive offset), an amplitude of the offset of the comparator is likely less than an amplitude of the external offset voltage, and thus the offset of the comparator is likely too small and the comparator may be rejected (e.g., as unreliable). Stated another way, if a polarity of the comparator output does not remain the same as before (e.g., as determined via the prior test) or does not remain the same for each strobe, the comparator may be rejected. Otherwise, comparators having outputs that remain the same polarity for each strobe, may be identified as reliable comparators (e.g., having suitable offsets for reliable key generation). According to some embodiments, reliable comparators may be used as PUF comparator cells (e.g., in key generation).

Figure 3:
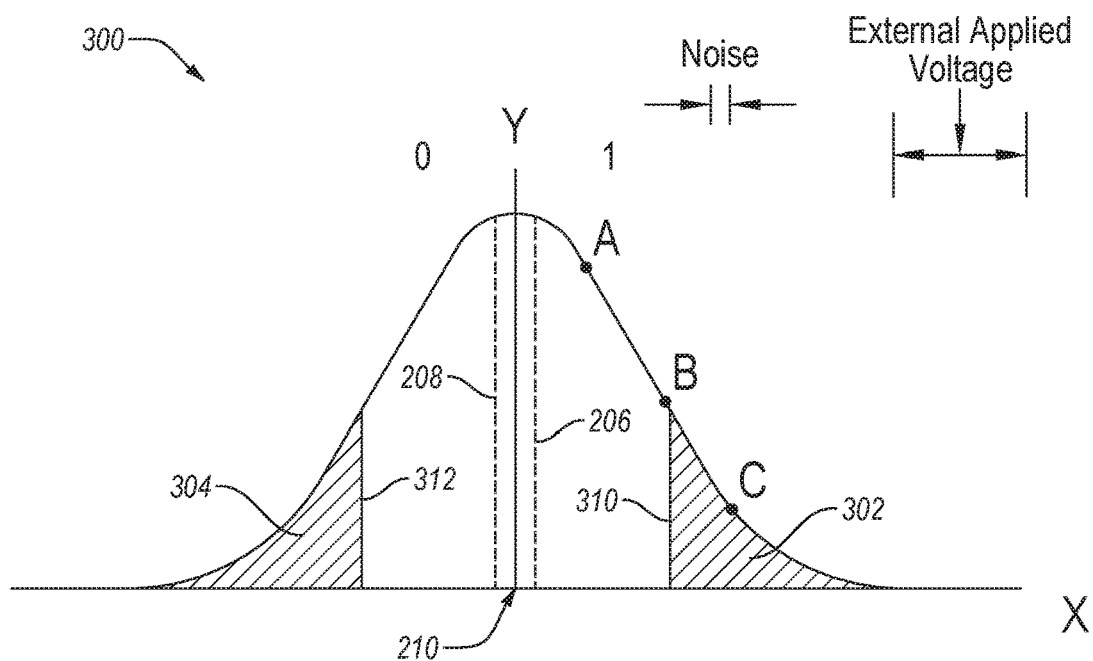

With reference to FIG. 3, which depicts a plot 300, a polarity of an output of a comparator having an input offset positioned between lines 310 and 312 (e.g., at either point A or point B), after an external offset voltage is applied to the comparator inputs, may not remain the same as before (e.g., as determined via the prior test), or may not remain the same for each strobe, and thus the comparator generating that output may be rejected. On the other hand, a polarity of an output to the left of line 312 (region 304) or to the right of line 310 (region 302, e.g., at point C) may remain the same as before and for each strobe, and thus, the comparator generating that output may be identified as a reliable comparator (e.g., that may be used as a comparator cell in key generation).

Figure 4:
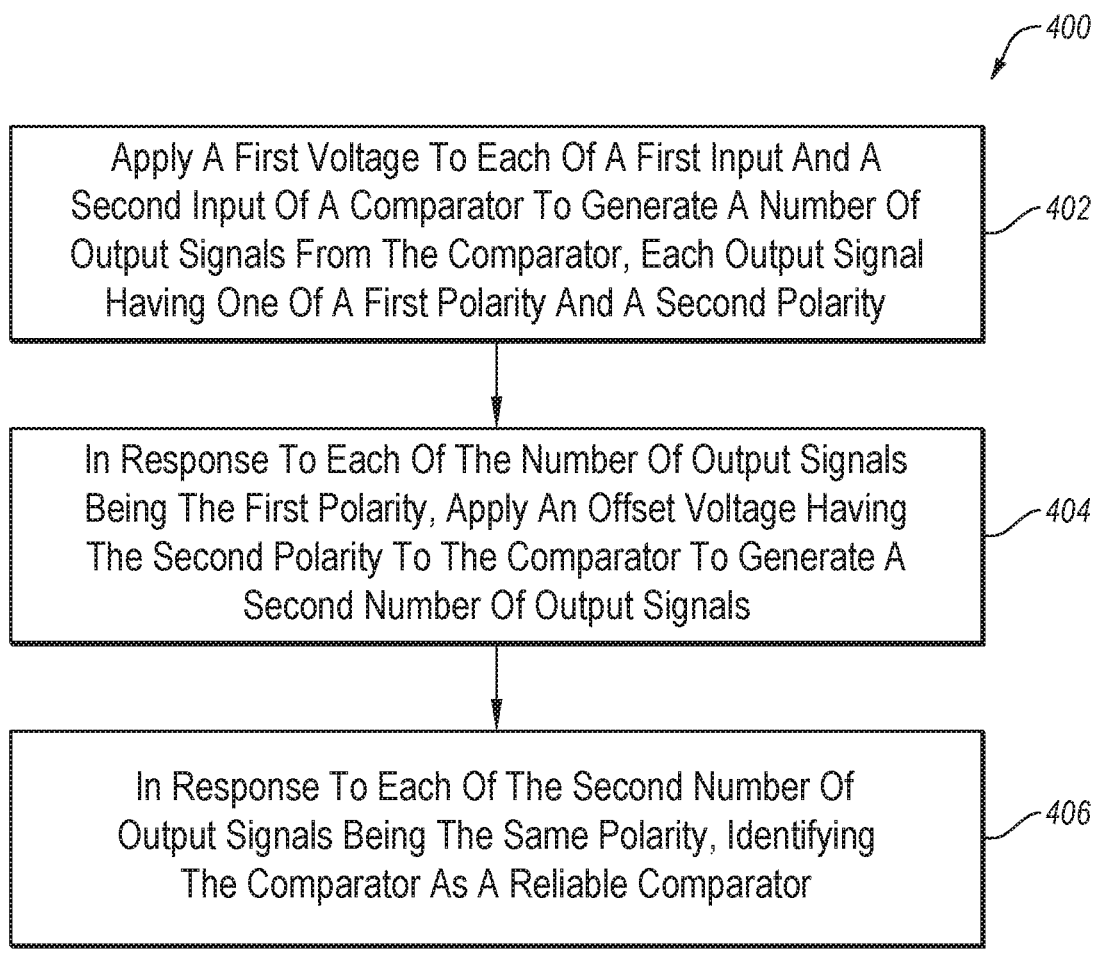
FIG. 4 is a flowchart of an example method of identifying a comparator with a suitable input offset for key generation.

FIG. 4 is a flowchart of an example method 400 of identifying a comparator with a suitable offset for key generation. Method 400 may be arranged in accordance with at least one embodiment described in the present disclosure. Method 400 may be performed, in some embodiments, by a device or system, such as a circuit 100 (see FIG. 1), circuit 500 (see FIG. 5), circuit 600 (see FIG. 6), system 800 (see FIG. 8), one or more of the components thereof, or another system or device. In these and other embodiments, method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

Method 400 may begin at block 402, wherein a first voltage may be applied to each of a first input and a second input of a comparator (e.g., via strobing a number of times) to generate a number of output signals from the comparator, and method 400 may proceed to block 404. For example, each output signal may have a one of a first polarity (e.g., a positive offset) and a second polarity (e.g., a negative offset).

At block 404, in response to each of the number of output signals being the first polarity, an external offset voltage may be applied to the comparator (e.g., via strobing a number of times) to generate a second number of output signals from the comparator, and method 400 may proceed to block 406. For example, the first voltage may be applied to the first input and a second voltage may be applied to the second input (e.g., a number of times) to generate the second number of output signals from the comparator, wherein a difference between the first voltage and the second voltage may be equal to the external offset voltage having the second polarity.

At block 406, in response to each of the second number of output signals being the same polarity, the comparator may be identified as a reliable comparator.

Modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, a reliable comparator may be used for generating a key, which may be used for data encryption and/or data decryption. More specifically, the reliable comparator may be used as a cell for generating one or more bits of a multi-bit key, as described further below.

Figure 5:
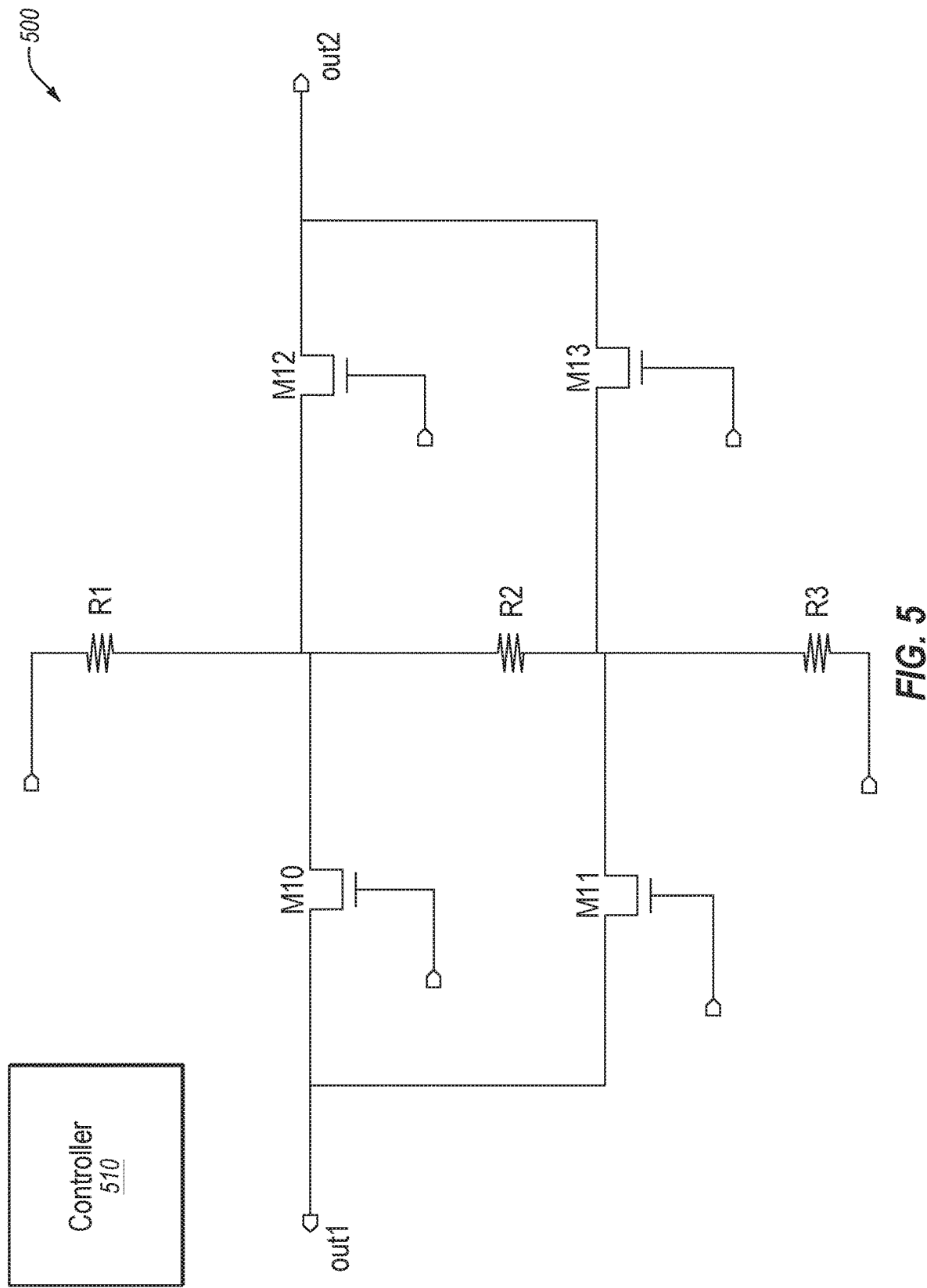
FIG. 5 is an example circuit for generating an external offset voltage, in accordance with various embodiments of the disclosure.

FIG. 5 depicts an example circuit 500 for generating an external offset voltage. Circuit 500, which may also be referred to as a "resistor string," may include a number of switches (e.g., transistors M10-M13), a number of resistors R1-R3, and outputs out1 and out2. In some embodiments, outputs out1 and out2 may be coupled to inputs of a comparator (e.g., comparator 100 of FIG. 1). For example, output out1 may be coupled to a one input of a comparator, and output out2 may be coupled to another input of the comparator.

Further, depending on a configuration of transistors M10-M13, outputs out1 and out2 may or may not be coupled together. Thus, according to at least some embodiments, transistors M10-M13 be configured such that outputs out1 and out2 may be coupled together during one phase of a comparator testing process (e.g., by turning on both transistors M10 and M12, or both transistor M11 and M13), as described herein. In this example, outputs out1 and out2 may output a first voltage (e.g., to be supplied both inputs of a comparator). Further, transistors M10-M13 be configured such that outputs out1 and out2 are not coupled together during another phase of the comparator testing process, as also described herein (e.g., by turning on transistors M10 and M13 while setting transistor M11 and M12 to off or by turning on transistors M11 and M12 while setting transistor M10 and M13 to off). In this example, outputs out1 may output the first voltage (e.g., to be supplied to one input of a comparator), and out2 may output a second voltage (e.g., to be supplied to another input of the comparator). Circuit 500 is provided as an example of a circuit for generating an external offset voltage, and other circuits for generating an offset voltage are within the scope of the present disclosure. According to various embodiments, controller 510 may be configured for controlling a configuration of transistors M10-M13 (e.g., via one or more control signals).

Figure 6:
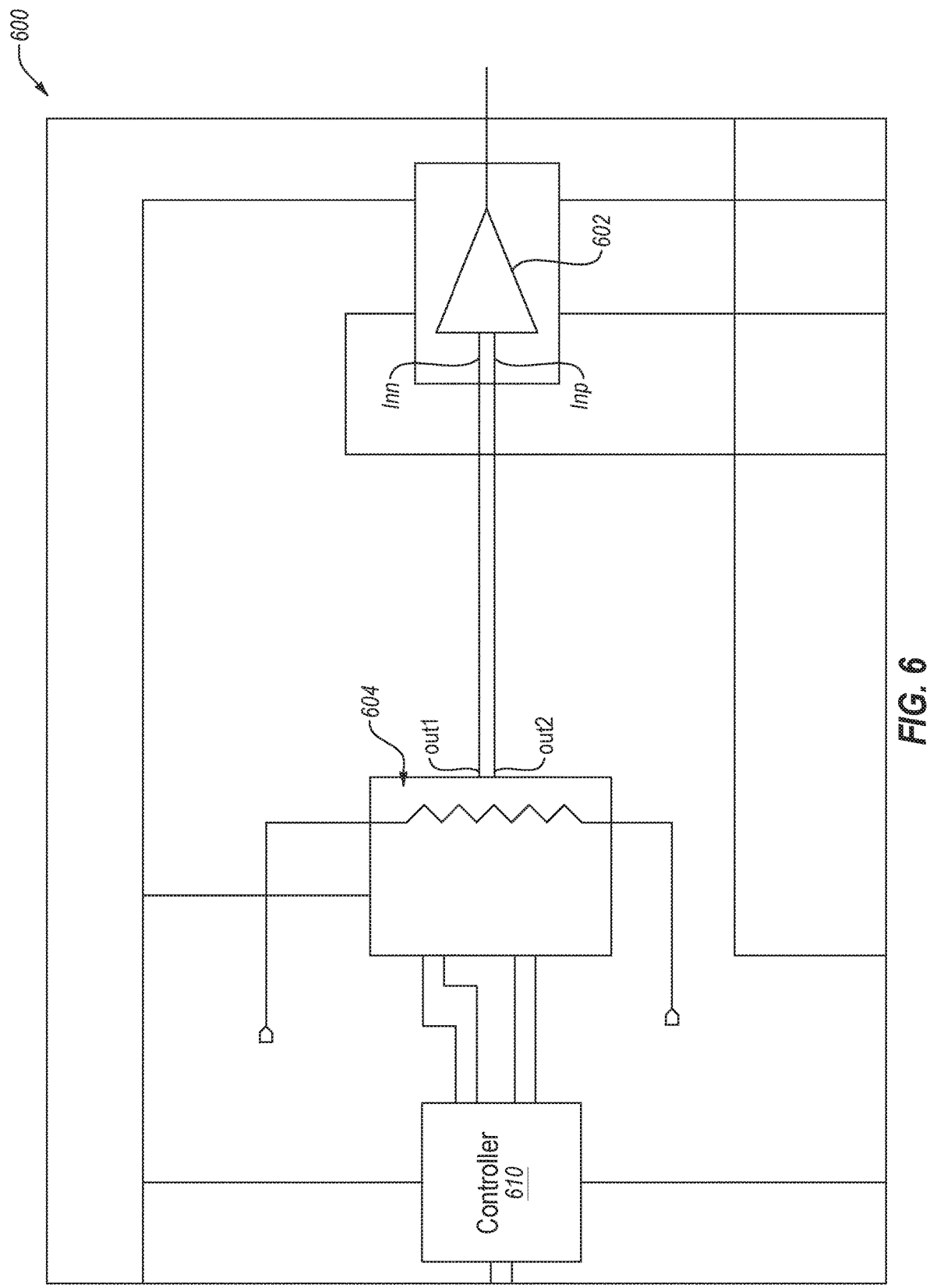
FIG. 6 is an example circuit diagram including a comparator coupled to a resistor string, according to one or more embodiments of the disclosure.

FIG. 6 illustrates an example system 600 including a comparator 602 (e.g., comparator 100 of FIG. 1), a resistor string 604 (e.g., circuit 500 of FIG. 5), and a controller 610 (e.g., controller 510 of FIG. 5), according to one or more embodiments of the disclosure. As depicted, outputs of resistor string 604 are coupled to inputs of comparator 602. System 600 is provided as an example system including a comparator and a resistor string, and other systems and/or devices including a resistor string coupled to a comparator are within the scope of the present disclosure.

Figure 7:
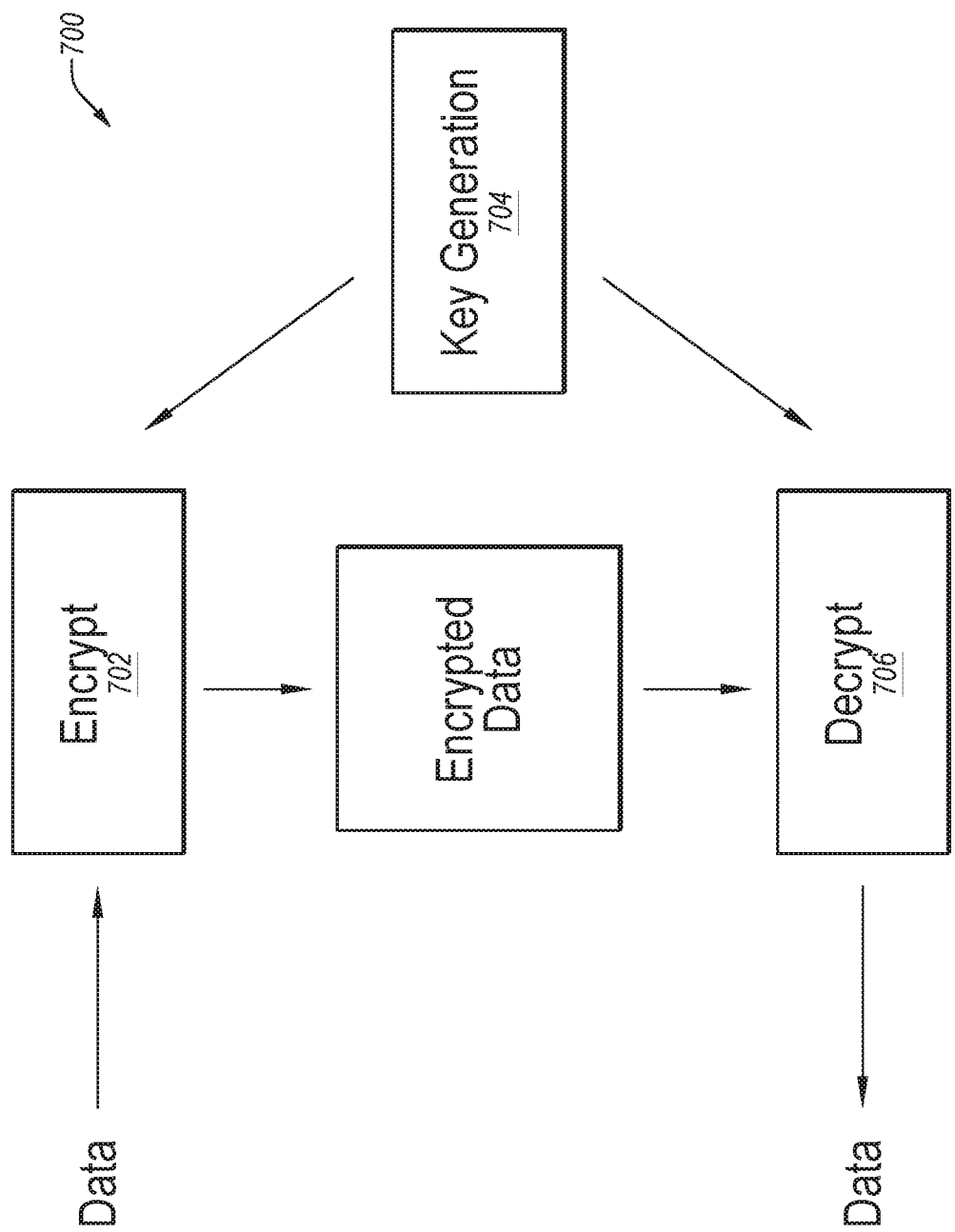
FIG. 7 is a block diagram of an example system, according to one or more embodiments of the disclosure.

FIG. 7 depicts an example system 700, in accordance with various embodiments of the present disclosure. System 700, which may be configured to encrypt and decrypt data (e.g., a secret), includes an encryption module 702, a key generation module 704, and a decryption module 706. For example, key generation module 704 may include one or more comparators for generating a key, which may be used to encrypt and/or decrypt data. More specifically, each comparator of key generation module 704 may be configured to generate one or more bits of a multi-bit key. Further, the one or more comparators of key generation module 704 may be identified as reliable comparators, in accordance with one or more embodiments disclosed herein.

Figure 8:
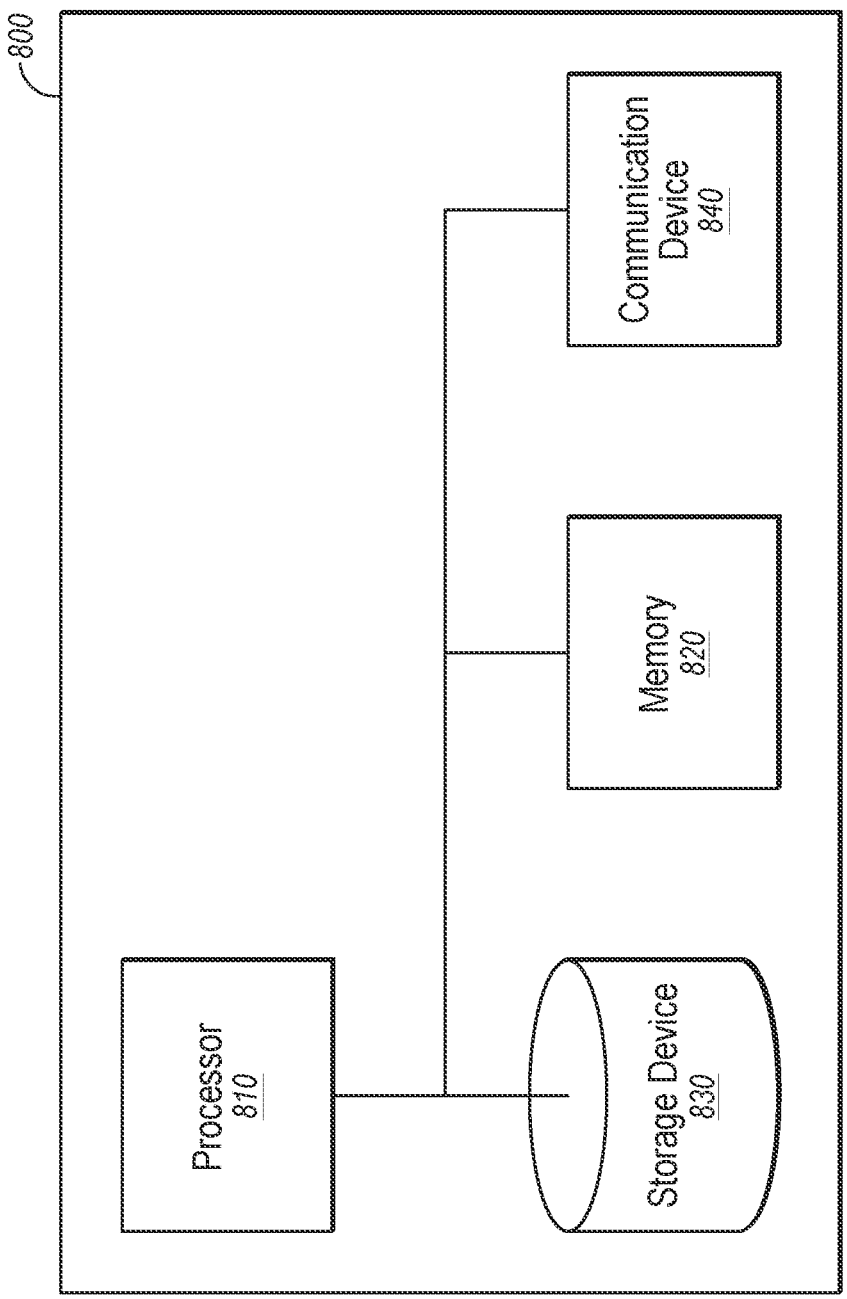
FIG. 8 is a block diagram of an example computing system.

FIG. 8 illustrates an example system 800, according to at least one embodiment described herein. System 800 may include any suitable system, apparatus, or device configured for classifying comparators. System 800 may include a processor 810, a memory 820, a data storage 830, and a communication device 840, which all may be communicatively coupled. Data storage 830 may include various types of data, such as offset polarities for one or more comparators, testing information (e.g., related to one or more comparators), reliability information (e.g., related to one or more comparators), or any other information related to classifying comparators based on comparator offsets.

Generally, processor 810 may include any suitable special-purpose or general-purpose computer, computing entity, or processing device including various computer hardware or software modules and may be configured to execute instructions stored on any applicable computer-readable storage media. For example, processor 810 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 8, it is understood that processor 810 may include any number of processors distributed across any number of network or physical locations that are configured to perform individually or collectively any number of operations described herein. In some embodiments, processor 810 may interpret and/or execute program instructions and/or process data stored in memory 820, data storage 830, or memory 820 and data storage 830. In some embodiments, processor 810 may fetch program instructions from data storage 830 and load the program instructions into memory 820. In one embodiment, instructions executing method 400 may be stored in memory 820 and executed by processor 810.

After the program instructions are loaded into memory 820, processor 810 may execute the program instructions, such as instructions to perform one or more blocks of method 200 and/or method 300 as described herein. According to various embodiments, processor 810 may perform one or more testing operations. For example, processor 810 may apply a first voltage to each input of a comparator, and process a first output generated by the comparator. Further, processor 810 may identify the comparator as an unreliable comparator based on the first output. Moreover, processor 810 may apply an offset voltage to the comparator, and process a second output generated by the comparator. Moreover, based on the second output, processor 810 may identify the comparator as either a reliable comparator or an unreliable comparator.

Memory 820 and data storage 830 may include computer-readable storage media or one or more computer-readable storage mediums for carrying or having computer-executable instructions or data structures stored thereon. Such computer-readable storage media may be any available media that may be accessed by a general-purpose or special-purpose computer, such as processor 810.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 810 to perform a certain operation or group of operations.

Communication unit 840 may include any component, device, system, or combination thereof that is configured to transmit or receive information over a network. In some embodiments, communication unit 840 may communicate with other devices at other locations, the same location, or even other components within the same system. For example, communication unit 840 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. Communication unit 840 may permit data to be exchanged with a network and/or any other devices or systems described in the present disclosure. For example, communication unit 840 may allow system 800 to communicate with other systems and/or devices.

Modifications, additions, or omissions may be made to system 800 without departing from the scope of the present disclosure. For example, data storage 830 may be multiple different storage mediums located in multiple locations and accessed by processor 810 through a network.

As indicated above, the embodiments described herein may include the use of a special purpose or general purpose computer (e.g., processor 810 of FIG. 8) including various computer hardware or software modules, as discussed in greater detail below. Further, as indicated above, embodiments described herein may be implemented using computer-readable media (e.g., memory 820 or data storage 830 of FIG. 8) for carrying or having computer-executable instructions or data structures stored thereon.

Various embodiments relate to a method of classifying a comparator. For example, a method may include strobing a comparator multiple times with an offset voltage to generate a number of output signals from the comparator. Further, in response to each of the number of output signals having a same polarity, identifying the comparator as a reliable comparator.

According to one or more other embodiments, a method may include applying a first voltage to each of a first input and a second input of a comparator (e.g., via strobing a number of times) to generate a number of output signals from the comparator. Each output signal may include one of a first polarity and a second polarity. Further, the method may include, in response to each of the number of output signals being the first polarity, applying an offset voltage having the second polarity to the comparator (e.g., via strobing a number of times) to generate a second number of output signals. Furthermore, the method may include, response to each of the second number of output signals having the same polarity, identifying the comparator as a reliable comparator.

In yet one or more other embodiments, a method may include, for each comparator of a number of comparators, strobing a comparator with a first voltage at each of a first input and a second input of the comparator to generate a number of output signals from the comparator, each output signal having one of a first polarity and a second polarity. In addition, the method may include, in response to each output signal of the number of output signal having the first polarity, strobing the comparator with an external offset voltage having the second polarity to generate a second number of output signals from the comparator. Further, the method may include, in response to each output signal of the second number of output signals having the first polarity, identifying the comparator as a reliable comparator. The method may also include generating a key via a number of reliable comparators.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

I claim:

1. A method, comprising;
applying, multiple times during a first phase of a comparator testing process, a same voltage to both of a first input and a second input of a comparator;
applying, multiple times during a second phase of the comparator testing process, an external offset voltage to the first and the second input of the comparator, a polarity exhibited by the external offset voltage opposite a polarity respectively exhibited by output signals generated by the comparator responsive to the same voltage applied multiple times during the first phase of the comparator testing process; and
generating an indication of reliability, wherein generating the indication of reliability comprises:
generating an indication of an unreliable comparator responsive to respective second output signals generated by the comparator responsive to the external offset voltage applied multiple times during the second phase of the comparator testing process exhibiting different polarity than the polarity respectively exhibited by output signals generated by the comparator responsive to the applied same voltage; or
generating an indication of a reliable comparator responsive to respective second output signals generated by the comparator responsive to the external offset voltage applied multiple times during the second phase of the comparator testing process exhibiting same polarity as the polarity respectively exhibited by output signals generated by the comparator responsive to the applied same voltage.

2. The method of claim 1, comprising generating a key via the comparator.

3. The method of claim 2, wherein generating the key comprises generating at least one bit of the key via the comparator.

4. The method of claim 2, comprising utilizing the key for at least one of encrypting or decrypting data.

5. A method, comprising:
applying, multiple times via a strobe, a first voltage to both of a first input and a second input of a comparator to generate first output signals from the comparator, respective first output signals exhibiting one of a first polarity or a second polarity;
in response to respective first output signals exhibiting the first polarity, applying, multiple times via the strobe, an external offset voltage exhibiting the second polarity to the comparator to generate second output signals; and
indicating reliability of the comparator, wherein the indicating reliability of the comparator comprises:
indicating unreliable comparator responsive to respective second output signals generated by the comparator responsive to the external offset voltage applied multiple times during a second phase of the comparator testing process exhibiting different polarity than the polarity respectively exhibited by output signals generated by the comparator responsive to an applied same voltage; or indicating reliable comparator responsive to respective second output signals generated by the comparator responsive to the external offset voltage applied multiple times during the second phase of the comparator testing process exhibiting same polarity as the polarity respectively exhibited by output signals generated by the comparator responsive to the applied same voltage.

6. The method of claim 5, wherein applying the external offset voltage comprises applying the first voltage to the first input and a second voltage to the second input of the comparator to generate the second output signals from the comparator, a difference between the first voltage and the second voltage comprising the external offset voltage.

7. The method of claim 6, comprising generating each of the first voltage and the second voltage via a voltage generation circuit including switches, resistors, and outputs.

8. The method of claim 5, comprising at least one of encrypting and decrypting data with the comparator indicated as reliable.

9. The method of claim 5, comprising generating the first voltage via a resistor string.

10. The method of claim 9, comprising generating the external offset voltage via the resistor string.

11. The method of claim 9, wherein generating the external offset voltage comprises generating a second voltage via the resistor string, a difference between the first voltage and the second voltage comprising the external offset voltage.

12. A method, comprising:

applying a first voltage to both of a first input and a second input of a comparator multiple times to generate first output signals from the comparator;

responsive to determining that the first output signals generated from the comparator are either all positive values or all negative values, applying the first voltage to the first input and a second voltage to the second input multiple times to generate second output signals from the comparator, a difference between the first voltage and the second voltage comprising an external offset voltage, the external offset voltage having a negative value responsive to respective first output signals being all positive values, and the external offset voltage having a positive value responsive to respective first output signals being all negative values; and generating an indication of reliability of the comparator responsive to determining relationships between values of respective second output signals, the determining relationships comprising:

determining first relationships responsive to respective second output signals generated by the comparator responsive to the external offset voltage applied multiple times during a second phase of the comparator testing process exhibiting different polarity than the polarity respectively exhibited by output signals generated by the comparator responsive to an applied same voltage; or determining second relationships responsive to respective second output signals generated by the comparator responsive to the external offset voltage applied multiple times during the second phase of the comparator testing process exhibiting same polarity as the polarity respectively exhibited by output signals generated by the comparator responsive to the applied same voltage.

13. The method of claim 12, comprising, responsive to values of respective second output signals being all positive values or all negative values, generating, via the reliable comparator, one or more bits of a multi-bit encryption key.

* * * * *